US008204022B2

United States Patent
Lassers et al.

(10) Patent No.: US 8,204,022 B2
(45) Date of Patent: Jun. 19, 2012

(54) METHOD OF PROVIDING TRANSCODING DURING VOICE-OVER-INTERNET PROTOCOL HANDOFF

(75) Inventors: Harold Aaron Lassers, Elmhurst, IL (US); Chung-Zin Liu, Naperville, IL (US)

(73) Assignee: Alcatel Lucent, Paris (FR)

( * ) Notice: Subject to any disclaimer, the term of this patent is extended or adjusted under 35 U.S.C. 154(b) by 883 days.

(21) Appl. No.: 12/243,989

(22) Filed: Oct. 2, 2008

(65) Prior Publication Data

US 2009/0209255 A1    Aug. 20, 2009

Related U.S. Application Data

(60) Provisional application No. 61/030,110, filed on Feb. 20, 2008.

(51) Int. Cl.
*H04W 4/00* (2009.01)
*H04W 36/00* (2009.01)
*H04J 3/16* (2006.01)

(52) U.S. Cl. .................. 370/331; 370/466; 455/436

(58) Field of Classification Search .......... 370/331–334, 370/466; 455/436–444
See application file for complete search history.

(56) References Cited

U.S. PATENT DOCUMENTS

| | | | |
|---|---|---|---|
| 2003/0224791 A1* | 12/2003 | Choi et al. | 455/436 |
| 2004/0180660 A1* | 9/2004 | Choi et al. | 455/436 |
| 2005/0037790 A1* | 2/2005 | Chang | 455/510 |
| 2006/0002325 A1* | 1/2006 | Chang | 370/328 |
| 2008/0013619 A1* | 1/2008 | Meylan et al. | 375/240 |
| 2008/0039088 A1* | 2/2008 | Fukushima et al. | 455/436 |
| 2008/0219212 A1* | 9/2008 | Kim | 370/331 |

FOREIGN PATENT DOCUMENTS

EP    1 225 773 A    7/2002

OTHER PUBLICATIONS

International Search Report PCT/US2009/001024 dated Dec. 30, 2009.
Bruhn, S. et al., "Concepts and Solutions for Link Adaptation and Inband Signaling for the GSM AMR Speech Coding Standard" *Vehicular Technology Conference*, 1999 IEEE 49th Houston, TX, USA May 16-20, 1999 Piscataway, NJ, USA, IEEE, US. vol. 3, May 16, 1999, pp. 2451-2455, XP010342317 ISBN: 978-0-7803-5565-1.
"Packet-Based Multimedia Communications Systems; H. 323 (06/06)" ITU-T Draft Study Period 2005-2008, *International Telecommunication Union*, Geneva; CH, No. H.323 (06/06), Jun. 6, 2006, pp. 1-318, XP017404822.

* cited by examiner

*Primary Examiner* — Ricky Ngo
*Assistant Examiner* — Paul H Masur
(74) *Attorney, Agent, or Firm* — Williams, Morgan & Amerson, PC

(57) ABSTRACT

The present invention provides a method for supporting handoffs of a first mobile unit in a wireless communication system that supports multiple vocoder technologies. The method includes allocating, prior to completion of a handoff of the first mobile unit, a transcoder function to the first mobile unit. The method also includes detecting a change in a format of at least one packet received from the first mobile unit. The change indicates that the vocoder technology used by the first mobile unit to form packets has changed. The method also includes transcoding packets in response to detecting the change in the format.

18 Claims, 3 Drawing Sheets

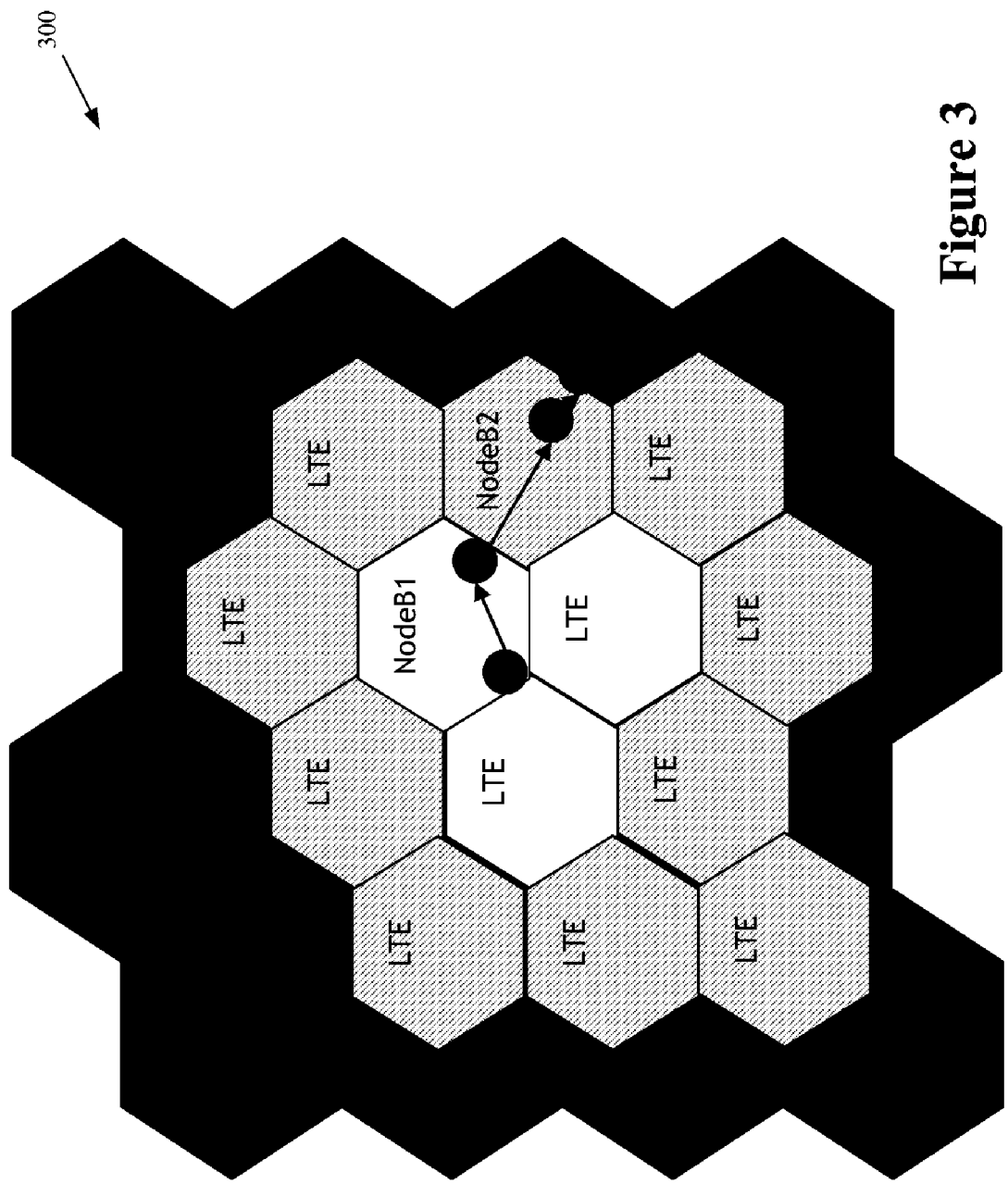

METHOD OF PROVIDING TRANSCODING DURING VOICE-OVER-INTERNET PROTOCOL HANDOFF

CLAIM TO EARLIER EFFECTIVE FILING DATE

WE HEREBY CLAIM THE EARLIER EFFECTIVE FILING DATE OF U.S. PROVISIONAL APPLICATION NO. 61/030,110 FILED FEB. 20, 2008.

BACKGROUND OF THE INVENTION

1. Field of the Invention

This invention relates generally to communication systems, and, more particularly, to wireless communication systems.

2. Description of the Related Art

Conventional wireless communication systems include numerous base stations (also referred to as node-Bs) that may be used to provide wireless connectivity to mobile units. When a user of the mobile unit wants to place a call or when the network detects a call destined for the mobile unit, the base station and the mobile unit form a wireless communication link over the air interface between the devices. Information may then be exchanged between the base station and the mobile unit. Mobile units typically encounter a heterogeneous environment including end points and inter-network interfaces that operate according to different standards and protocols. For example, the wireless communication system may include end points and/or inter-network interfaces that operate according to Third Generation Partnership Project (3GPP) standards and/or protocols for Universal Mobile Telecommunication Service (UMTS) Terrestrial Radio Access Network (UTRAN) communication, e.g., the Long Term Evolution (LTE) standards. The wireless communication system may also include other end points and/or inter-network interfaces that operate according to other standards such as the Third Generation Partnership Project 2 (3GPP2) standards and/or protocols for high rate packet data (HRPD) communication. Furthermore, a wireless communication system is often required to interwork with end points and interfaces that operate according to IETF or other protocols. Mobile units therefore often support multiple types of interfaces to allow them to establish links with different types of networks and to hand off between these networks.

Information transmitted over the air interfaces may be encoded as digital information, i.e., bits. One increasingly popular technique for transmitting voice information associated with a call is the Voice-over-Internet-Protocol (VoIP). In VoIP, a digital representation of the voice information is transmitted as a payload in an IP packet. For example, mobile units such as cell phones include vocoders that can convert a received analog signal representative of audio input into a digital representation that can be transmitted over the air interface. Vocoders use knowledge of the patterns in human speech, as well as information derived from the audio signal itself, to efficiently encode voice signals. The encoded digital representation may then be transported as the payload in one or more IP packets. Vocoders are also used to convert received digital payloads into an analog signal that corresponds to the audio input used to create the digital payload. Examples of vocoders are adaptive multi-rate (AMR) vocoders and extended variable-rate coding (EVRC) vocoders.

In a heterogeneous environment, the numerous mobile units in the wireless communication system may not all be using compatible vocoder technologies. For example, mobile units may include AMR vocoders, EVRC vocoders, or (in the case of dual-mode mobile units) both AMR and EVRC vocoders. Various network interfaces may also use different vocoder technologies. LTE network interfaces typically support AMR vocoders, whereas the interfaces in HRPD networks typically support EVRC vocoders. Different types of vocoders can utilize incompatible digital formats and consequently one type of vocoder cannot reproduce the audio input represented by digital information generated by a different type of vocoder. Digital service providers may therefore implement transcoders to transcode the digital information formed using one type of vocoder into a format that is compatible with a different type of vocoder. Adding a transcoder into the communication path between two mobile units may permit the mobile units to exchange VoIP packets even though the mobile units use incompatible vocoders. For example, a transcoder may be used to convert packets formed by an AMR vocoder into a format that can be understood by an EVRC vocoder.

A transcoder can be inserted into the communication path when a call is initiated between mobile units that use incompatible vocoders. For example, a network entity may be used to determine the type of vocoder supported by each user when a first user initiates a call to a second user. No transcoder is inserted into the communication path if the two users implement the same vocoder (or compatible vocoders). However, the transcoding requirements of each mobile unit can change when the call is handed over. For example, a call that is initially established between to mobile units that implement AMR vocoders over a network that supports AMR vocoders may not need any transcoding. But if one of the mobile units hands-off to a network or network interface that requires a different vocoder, such as an EVRC vocoder, then transcoding between the two vocoder technologies may be necessary.

One potential solution to this problem is to allocate a transcoder to every call when the call is initiated. The transcoder will then be available to perform transcoding if one of the mobile units hands-off to a network interface that requires an incompatible vocoding technology. However, allocation of the transcoder when the call is initiated and the subsequent operation of the transcoder consume hardware resources and processing time. If no transcoding is necessary, or if transcoding is only necessary during a relatively small fraction of the call duration, then the hardware resources and processing time devoted to supporting the transcoder are largely wasted. Furthermore, transcoding requires decoding the received information according to the first vocoder technology, "listening" to the decoded audio signal for a short time, and then re-encoding the audio signal according to the second vocoder technology using information derived while listening to the decoded audio signal. This process may result in radio bearer delays which may degrade the user experience.

Another potential solution to this problem is to allocate a transcoder after the network receives a handoff request from a mobile unit and determines that the mobile unit is handing off to a network interface that requires an incompatible vocoder technology. Conventional wireless communication systems require that any delays created by a handoff be limited to avoid degrading the user experience. For example, some standards require that switching delays last no more than approximately 300 ms. However, the potential delays that can result when a mobile phone roams between network types may be significantly longer than this limit because the network must determine if transcoding is necessary in the new network. For example, if a first mobile unit roams from a UTRAN network to a HRPD network it must switch from the AMR vocoder to the EVRC vocoder. If the first dual-mode mobile unit is in a call with a second mobile unit that only implements an AMR vocoder, then the network must insert a transcoder into the communication pathway from the first mobile unit to the second mobile unit. The time required to detect the need for the transcoder and then insert the transcoder into the pathway is significantly longer than the 300 ms limit set by conventional wireless communication systems.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for supporting handoffs of a first mobile unit in a wireless communication system that supports multiple vocoder technologies. The method includes allocating, prior to completion of a handoff of the first mobile unit, a transcoder function to the first mobile unit. The method also includes detecting a change in a format of at least one packet received from the first mobile unit. The change indicates that the vocoder technology used by the first mobile unit to form packets has changed. The method also includes transcoding packets in response to detecting the change in the format.

In another embodiment of the present invention, a method is provided for implementation in a first mobile unit that supports handoffs in a wireless communication system that supports multiple vocoder technologies. The method includes transmitting, prior to completion of a handoff of the first mobile unit, a request to allocate a transcoder function to the first mobile unit. The method also includes switching from a first vocoder technology to a second vocoder technology in response to handing off. The format of packets formed according to the second vocoder technology is incompatible with the format of packets formed according to the first vocoder technology. The method further includes transmitting packets formed according to the second vocoder technology towards the allocated transcoder function.

BRIEF DESCRIPTION OF THE DRAWINGS

The invention may be understood by reference to the following description taken in conjunction with the accompanying drawings, in which like reference numerals identify like elements, and in which:

FIG. 3 conceptually illustrates one exemplary embodiment of a wireless communication system that depicts pre-allocation of a transcoder, in accordance with the present invention.

Figure 1:
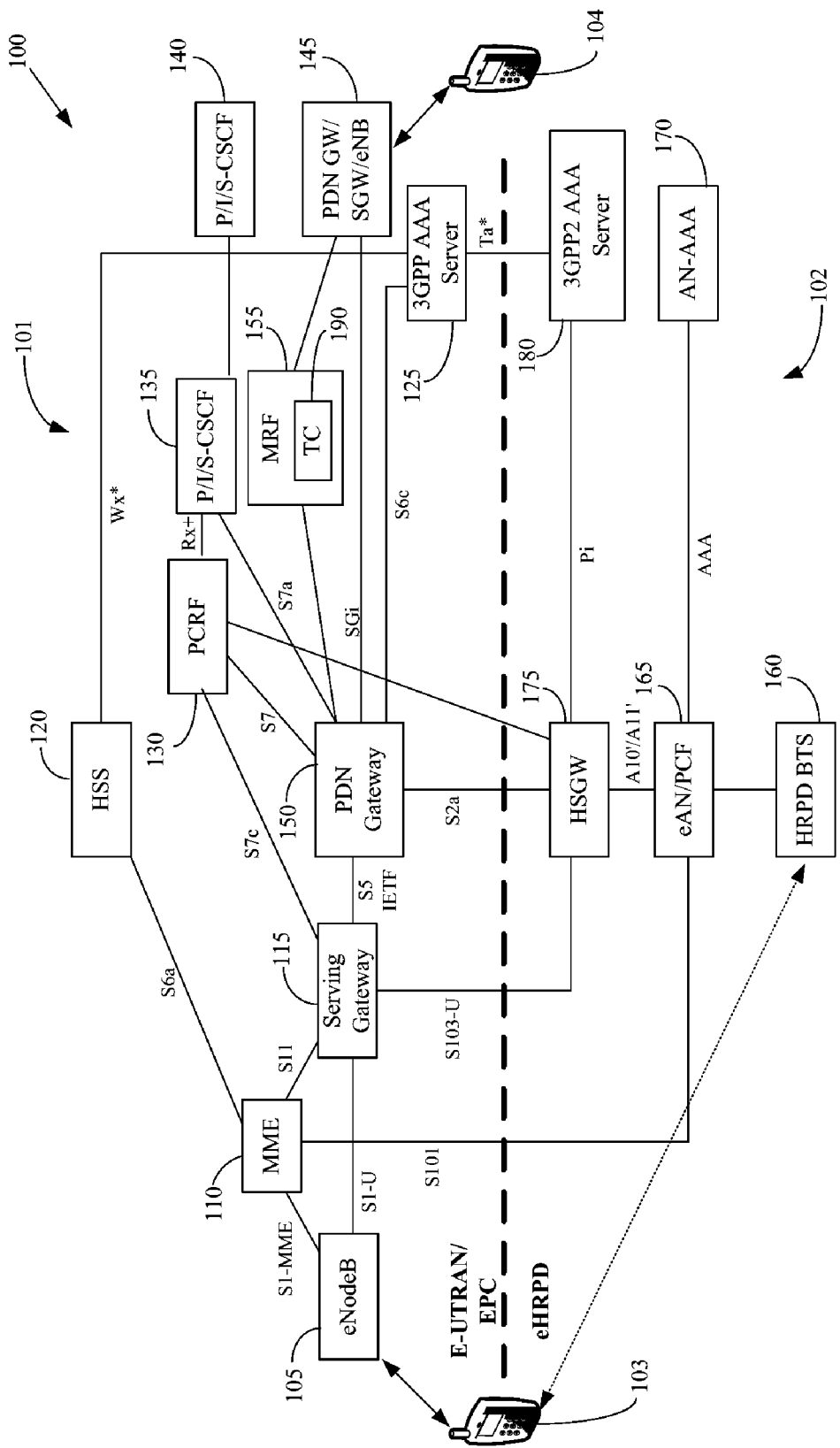
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes two networks 101, 102 that may provide overlapping and/or concurrent wireless coverage using interfaces to mobile units 103, 104. The network 101 shown in FIG. 1 operates according to Third Generation Partnership Project (3GPP) standards and/or protocols for Universal Mobile Telecommunication Service (UMTS) Terrestrial Radio Access Network (UTRAN) communication, e.g., the Long Term Evolution (LTE) standards. The network 102 shown in FIG. 1 operates according to a different standard such as the Third Generation Partnership Project 2 (3GPP2) standards and/or protocols for high rate packet data (HRPD) communication. However, persons of ordinary skill in the art having benefit of the present disclosure should appreciate that FIG. 1 is exemplary and is not intended to limit the present invention to networks that operate according to these particular standards and/or protocols. In alternative embodiments, the networks 101, 102 may operate according to other standards and/or protocols. Moreover, the wireless communication system 100 may include additional networks that provide overlapping and/or concurrent wireless service.

The network 101 includes a base station or node-B 105 that can be used to establish wireless communication links with mobile units, such as the mobile unit 103. The base station 105 is connected to a mobility management entity (MME)

110 via an S1-MME interface and to a serving gateway 115 via an S1-U interface. The mobility management entity 110 is coupled to a home subscriber service (HSS) 120 via an S6 interface and the home subscriber service is coupled to an authentication, authorization, and accounting (AAA) server 125 via a Wx interface. The serving gateway 115 is coupled to a policy and charging rules function (PCRF) 130 via an S7 interface and the PCRF 130 is coupled to a call state control function (CSCF) 135 via an Rx interface. The CSCF 135 may include a proxy CSCF, an interrogating CSCF, and a serving CSCF. In the illustrated embodiment, the network 101 may include another CSCF 140 that is associated with a second base station 145, which may include or be coupled to a corresponding packet data node gateway (PDN-GW) and/or a serving gateway (SGW). The serving gateway 115 is also coupled to a packet data node (PDN) gateway 150 via an S5 interface. The packet data node gateway 150 is coupled to a mobility resource function (MRF) 155 via an S7 interface and to the base station 145 via an SG interface. The illustrated embodiment of the wireless communication system 100 also includes other interfaces including the s101, s11, s6a, s6c, s7, s7a, s7c, s103-U, s2a, Wx*, sG, Ta*, Pi, AA, and A10'/11' interfaces. Techniques for implementing and operating the entities that form the network 101 are known in the art and in the interest of clarity only those aspects of implementing and/or operating these entities that are relevant to the present invention will be discussed herein.

The network 102 includes an HRPD base transceiver station (BTS) 160 that can be used to establish wireless communication links with mobile units, such as the mobile unit 103. The base transceiver station 160 is coupled to an access network (AN) 165 that implements or is coupled to a packet control function (PCF). The access network 165 is connected to an access network AAA server 170 and a serving gateway (HSGW) 175, which may communicate with elements of the network 101 as shown in FIG. 1. In the illustrated embodiment, the serving gateway 175 is also coupled to an AAA server 180 that operates according to the standards and/or protocols established by 3GPP2. Techniques for implementing and operating the entities that form the network 102 are known in the art and in the interest of clarity only those aspects of implementing and/or operating these entities that are relevant to the present invention will be discussed herein.

The networks 101, 102 support packet-based voice communication between the mobile units 103, 104. In one embodiment, users of the mobile units 103, 104 can establish calls according to the Voice-over-Internet-Protocol (VoIP) using either of the networks 101, 102. For example, when a call is initiated between the mobile units 103, 104, the network 101 may establish a communication path between the mobile units 103, 104. The communication path may include the base station 105, the serving gateway 115, the packet data node gateway 150, and the base station 145. The mobile units 103, 104 implement one or more vocoders that operate according to the vocoder technology supported by the network 101. For example, the mobile units 103, 104 may implement AMR vocoders that are compatible with the UTRAN network 101 shown in FIG. 1.

In the illustrated embodiment, the mobile unit 103 is a dual-mode mobile unit that can establish wireless communication links with either of the networks 101, 102. The mobile unit 103 may therefore handoff between the networks 101, 102. For example, the mobile unit 103 may handoff from the network 101 to the network 102 when the signal strength of the base station 105 falls below a selected threshold, e.g., when the mobile unit 103 approaches or passes beyond a cell boundary. The handoff may be a hard handoff or a soft handoff in which the mobile unit 103 is able to maintain concurrent wireless communication links with both networks 101, 102. To support roaming between networks 101, 102, the mobile unit 103 implements multiple vocoder technologies as may be required by the different networks 101, 102. For example, the mobile unit 103 may implement an AMR vocoder for communicating via the network 101 and an EVRC vocoder for communicating via the network 102. The mobile unit 103 can switch between the multiple vocoders when switching between networks, e.g., the mobile unit 103 may switch from the AMR vocoder to the EVRC vocoder when the mobile unit 103 hands off from the network 101 to the network 102.

The mobile unit 104 may not always be able to switch to a different vocoder to maintain compatibility with the vocoder being used by the mobile unit 103. Handoff of the mobile unit 103 from the network 101 to the network 102 may therefore result in a vocoder mismatch. In various embodiments, vocoder mismatch may result because the mobile unit 104 does not support the same vocoder technologies as the mobile unit 103. The network 101 may therefore implement a transcoder 190 that may be inserted into the communication path between the mobile units 103, 104 so that packets transmitted between the two mobile units 103, 104 can be transcoded into compatible vocoder formats. For example, the transcoder 190 may be implemented in the mobility resource function 155.

The mobile unit 103 may request pre-allocation of the transcoder 190 prior to completion of a handover. In one embodiment, the mobile unit 103 may request allocation of the transcoder 190 when it determines that a handover may be imminent. For example, the mobile unit 103 may request allocation of the transcoder 190 when it is near the boundary of a cell and/or when it determines that signal strength associated with one or more of the base stations 105, 160 have changed in a way that makes a handoff likely and/or desirable. The network 101 can then modify the communication path between the mobile units 103, 104 so that the transcoder 190 is available to transcode packets transmitted by the mobile unit 103. In the illustrated embodiment, the network 101 modifies the communication path to insert the mobility resource function 155 (which implements the transcoder 190) between the packet data node gateway 150 and the base station 145.

In some cases, it may not be necessary to transcode packets transmitted between the mobile units 103, 104 immediately following the transcoder allocation request. For example, the expected handoff may not yet have occurred or may not have proceeded to the stage at which packets are being transmitted from the mobile unit 103 to the base station 160 in the new packet format associated with the new vocoder technology. As long as the transcoder 190 (or other entity) determines that the packets transmitted between the mobile units 103, 104 have been formed using compatible vocoder formats, the transcoder 190 allows the packets to pass without modification. Once the transcoder 190 detects a new packet format, the transcoder 190 may begin transcoding packets between the packet formats. For example, the mobile unit 103 may begin transmitting packets formed using the EVRC vocoder to the base station 160. These packets may be transmitted along a communication path including the access network 165, a serving gateway 175, and the packet data node gateway 150. When the packets arrive at the mobility resource function 155, the transcoder 190 may detect the new format and may transcode these packets into a format that is compatible with the AMR vocoder used by the mobile unit 104. Detection of the new and/or changing packet formats by the transcoder 190 may be performed in real-time. Pre-allocation of the transcoder 190 and/or real-time detection and transcoding of the new packet formats by the transcoder 190 may reduce overhead and/or time delays associated with adding the transcoder 190 to the communication path during a handoff.

Figure 2:
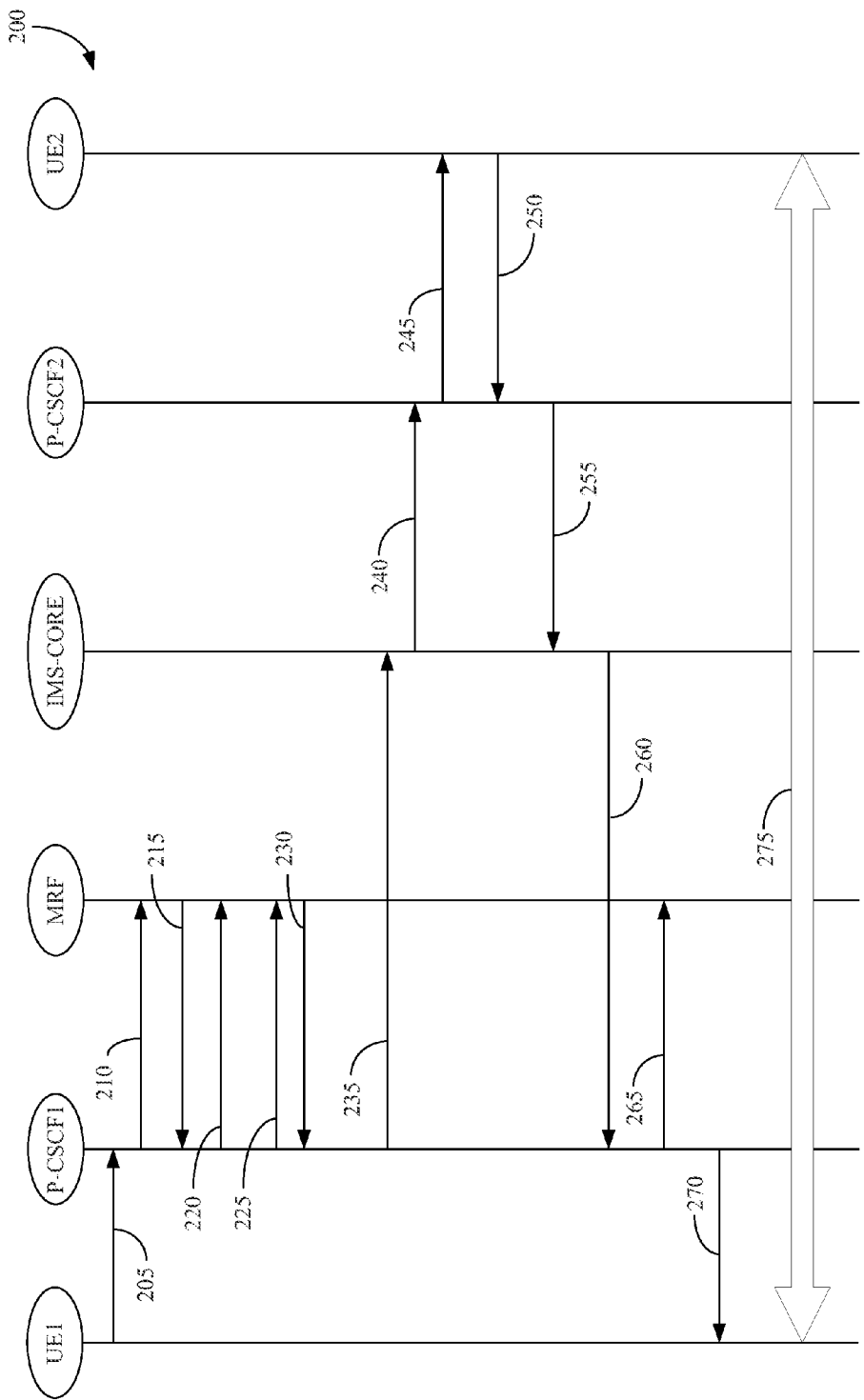
FIG. 2 conceptually illustrates one exemplary embodiment of a method of providing a transcoding function to support inter-network handoff, in accordance with the present invention.

FIG. 2 conceptually illustrates one exemplary embodiment of a method 200 of providing a transcoding function to support inter-network handoff. The method 200 may be implemented in a wireless communication system that supports communication between two mobile units (UE1, UE2) according to a Session Initiation Protocol (SIP). The system includes two proxy CSCF functions (P-CSCF1, P-CSCF2) that are associated with the two mobile units. A mobility resource function (MRF) that implements a transcoding function and an IP Multimedia Subsystem core network (IMS-CORE) also form part of the communication pathway between the mobile units. However, persons of ordinary skill in the art having benefit of the present disclosure should appreciate that the present invention is not limited to wireless communication systems that include these elements. In alternative embodiments, more or fewer elements may be included in the communication path between the mobile units.

The first mobile unit transmits a message to the P-CSCF1 requesting allocation of a transcoder, as indicated by the arrow 205. For example, the first mobile unit may transmit (at 205) a SIP Invite or Re-Invite message including an SDP indicating the new vocoder technology, such as the EVRC vocoder technology. The mobility resource function is then established and the P-CSCF1 transmits the transcoder allocation message to the mobility resource function to initiate allocation of the transcoder, as indicated by the arrow 210. The mobility resource function may then respond with a message (such as a 200 OK message) indicating that the transcoder has been allocated, as indicated by the arrow 215, which may be acknowledged by the P-CSCF, as indicated by the arrow 220. The P-CSCF1 may transmit (at 225) an additional invitation message and the mobility resource function may respond with information indicating the supported vocoder technologies, as indicated by the arrow 230. In one embodiment, allocating the transcoder includes providing information that can be used to map information transmitted in packets and/or messages to the corresponding vocoder technology that was used to form the packet. For example, the mapping may be used to translate bits in a packet header to the vocoder technology that was used to form the digital information in the payload of the packet.

Referring briefly to FIG. 1, in one embodiment of the method 200 that can be implemented in the wireless communication system 100, the mobile devices 103, 104 can provide information to the IMS elements such as the P/S/I-PSCF 135 that indicates which coders and/or vocoders can be supported by the mobile devices 103, 104. In one embodiment, this information is transmitted via a SIP INVITE, REINVITE, or UPDATE messages within the session description protocol (SDP). The actual bearer stream that is sent to the transcoder 190 via RTP protocol contains frame information including a "payload type". However, the coder/vocoder information provided by the mobile devices 103, 104 may not correspond exactly to the payload type in the bearer stream. Thus, in order for the transcoder 190 to determine the payload type of the packets in the bearer stream, the IMS elements 135 can communicate information that indicates a mapping of the payload type to the coder/vocoder that was used to form the packet. The IMS elements 135 may then send (to the MRF 155) an SDP message including the information indicating the mapping to the payload type to the appropriate coder/vocoder. This information may be sent at the time of the SIP Invite, Reinvite, or Update. The transcoder 190 within the MRF 155 can then examine each RTP (real time protocol) frame it receives, find the payload type, map it to a coder or vocoder using the mapping information, and execute the proper transcoding operation.

Referring back to FIG. 2, once the mobility resource function and the transcoder have been established, the P-CSCF1 transmits (at 235) a message, such as a SIP Invite message, to the IMS core network indicating that the communication pathway has been modified so that the mobility resource function is the bearer termination point for the second mobile unit. The transmitted message may also indicate an IP address of the mobility resource function so that the bearer can be configured properly for the modified communication pathway. The message is then forwarded (at 240) from the IMS core network to the second P-CSCF, which transmits the message to the second mobile unit, as indicated by the arrow 245. The second mobile unit then transmits (at 250) a message acknowledging reception of the information indicating the new bearer termination point and the acknowledgment message is forwarded (at 255) to the IMS core network, which forwards (at 260) the message to the P-CSCF1. The P-CSCF1 acknowledges (at 265) receipt of this message and then transmits (at 270) a message to the first mobile unit that indicates that the mobile resource function has been added to the communication pathway and is now the bearer termination point for the call. Additional SIP signaling for the handoff may then proceed (at 275).

FIG. 3 conceptually illustrates one exemplary embodiment of a wireless communication system 300 that depicts pre-allocation of a transcoder. In the illustrated embodiment, the wireless communication system 300 includes overlapping coverage of EVDO cells and LTE cells. Initially, a mobile unit is located at the location A (indicated by a circled A) in the LTE cell Node B1. The cell Node B1 is not a border cell for the LTE coverage area because it is completely surrounded by other LTE cells. The mobile unit is therefore attached only to the LTE cells in the wireless communication system 300 and does not have a transcoder pre-allocated to it. The mobile unit may be idle or may have an active call session in progress.

The mobile unit can roam to the location B, where it begins to detect a pilot signal transmitted by the Node B2. In the illustrated embodiment, the Node B2 broadcasts information indicating that this cell is a border cell and pre-allocation of a transcoder to the mobile unit is permitted. The broadcast information may include a sector identifier, a frequency and/or a band, and a pre-allocation zone. The mobile unit may then transmit a request for pre-allocation of a transcoder. In one embodiment, the mobile unit may wait until the pilot signal strength from the Node B2 pilot reaches a threshold value before transmitting the request for pre-allocation of the transcoder.

The Node B2 pilot signal strength falls as the mobile unit continues to move through the cell Node B2. At the location C, the pilot signal strength falls below a selected threshold level and the mobile unit begins to monitor pilot signals from the EVDO cells. At the location D, the mobile unit leaves the LTE coverage area and triggers a handoff to the EVDO cells. Idle mobile units may trigger the handoff procedure based upon pilot strength thresholds and active mobile units may trigger the handoff procedure based upon the LTE and EVDO pilot signal strengths. Following handoff of the mobile unit, the mobile unit may begin to transmit packets using a new vocoder technology. The pre-allocated transcoder can detect the new packet format and transcode the packets into the appropriate packet format for the original vocoder technology. However, persons of ordinary skill in the art having benefit of the present disclosure should appreciate that in some cases the mobile unit may not handoff to the EVDO cell, e.g., if the mobile unit returns to the cell Node B. The transcoder may therefore be de-allocated if the wireless communication system 300 determines that a handoff to an EVDO cell is not likely to occur in the near future.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method for supporting handoffs of a first mobile unit in a wireless communication system that supports multiple vocoder technologies, comprising:
    allocating, prior to initiating a handoff of the first mobile unit that results in a change in a vocoder technology used by the mobile unit, a transcoder function to the first mobile unit, wherein the transcoder function is inserted in a communication path established between the first mobile unit and a second mobile unit prior to the handoff;
    detecting a change in a format of at least one packet received from the first mobile unit, the change indicating that the vocoder technology used by the first mobile unit to form said at least one packet has changed; and
    transcoding, using the transcoder function, said at least one packet in response to detecting the change in the format.

2. The method of claim 1, wherein allocating the transcoder function comprises allocating the transcoder function in response to receiving a request from the first mobile unit to allocate the transcoder function after establishing a call between the first mobile unit and the second mobile unit.

3. The method of claim 2, wherein establishing the call between the first and second mobile units comprises establishing the call using compatible vocoder technologies supported by first and second interfaces to the first and second mobile units.

4. The method of claim 3, comprising receiving the transcoder allocation request from the first mobile unit in response to the first mobile unit detecting a potential handoff requiring a change in the vocoder technology used by the first mobile unit to a vocoder technology that is incompatible with the vocoder technology used for the interface to the second mobile unit.

5. The method of claim 4, wherein receiving the transcoder allocation request comprises receiving the transcoder allocation request in response to the first mobile unit detecting at least one of proximity to a cell boundary or a signal strength that is below a selected threshold.

6. The method of claim 5, wherein allocating the transcoder function comprises modifying a communication path between the first and the second mobile units to include a transcoder function.

7. The method of claim 6, wherein allocating the transcoder function comprises providing information indicating a mapping between a packet frame type and a vocoder technology.

8. The method of claim 6, wherein detecting a change in the format of said at least one packet comprises detecting the change in the format of said at least one packet in real time.

9. The method of claim 8, wherein detecting a change in the format of said at least one packet comprises detecting a change in the format of said at least one packet from a first vocoder format supported by the first network to a second vocoder format supported by the second network, the second vocoder format being incompatible with the first vocoder format.

10. The method of claim 9, wherein transcoding said at least one packet comprises transcoding said at least one packet between the first vocoder format and the second vocoder format.

11. A method implemented in a first mobile unit that supports handoffs in a wireless communication system that supports multiple vocoder technologies, comprising:
    transmitting, prior to initiation of a handoff of the first mobile unit, a request to allocate a transcoder function to the first mobile unit, wherein the transcoder function is inserted, prior to the handoff, into a communication path established between the first mobile unit and a second mobile unit;
    switching from a first vocoder technology to a second vocoder technology in response to handing off the first mobile unit, a format of packets formed according to the second vocoder technology being incompatible with a format of packets formed according to the first vocoder technology; and transmitting at least one packet formed according to the second vocoder technology towards the allocated transcoder function.

12. The method of claim 11, further comprising establishing a call over the communication path between the first mobile unit and the second mobile unit, the call being established prior to the first mobile unit transmitting the transcoder allocation request.

13. The method of claim 12, wherein establishing the call between the first and second mobile units comprises establishing the call using compatible vocoder technologies used by interfaces to the first and second mobile units.

14. The method of claim 13, comprising detecting a potential handoff requiring a change in the vocoder technology used by the interface to the first mobile unit to a vocoder technology that is incompatible with the vocoder technology used by the interface to the second mobile unit.

15. The method of claim 14, wherein detecting the potential handoff comprises detecting at least one of proximity to a cell boundary or a signal strength that is below a selected threshold.

16. The method of claim 15, wherein transmitting the transcoder allocation request comprises transmitting the transcoder allocation request in response to detecting the potential handoff.

17. The method of claim 16, comprising receiving information indicating modification of a communication path between the first and the second mobile units to include the transcoder function.

18. The method of claim 17, comprising receiving at least one packet from the second mobile unit, said at least one packet having been transcoded between the first vocoder format and the second vocoder format by the transcoder function.

* * * * *